(12) United States Patent
Natal et al.

(10) Patent No.: US 11,647,019 B2
(45) Date of Patent: May 9, 2023

(54) SYSTEMS AND METHODS FOR PROVIDING SECURITY ORCHESTRATION FOR TRUSTED TRAFFIC SEGMENTATION ON UNTRUSTED DEVICES

(71) Applicant: Cisco Technology, Inc., San Jose, CA (US)

(72) Inventors: Alberto Rodriguez Natal, Mountain View, CA (US); Mikhail Davidov, Seattle, WA (US); Lorand Jakab, Gheorghieni (RO); Richard James Smith, Detroit, MI (US); Fabio Maino, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 617 days.

(21) Appl. No.: 16/654,160

(22) Filed: Oct. 16, 2019

(65) Prior Publication Data

US 2021/0119993 A1    Apr. 22, 2021

(51) Int. Cl.
*H04L 9/40* (2022.01)
*H04L 9/32* (2006.01)
*G06F 21/34* (2013.01)
*G06F 21/60* (2013.01)

(52) U.S. Cl.
CPC .......... *H04L 63/0853* (2013.01); *G06F 21/34* (2013.01); *G06F 21/602* (2013.01); *H04L 9/32* (2013.01); *H04L 63/0428* (2013.01); *H04L 63/061* (2013.01); *H04L 63/10* (2013.01)

(58) Field of Classification Search
CPC ... H04L 63/0853; H04L 9/32; H04L 63/0428; H04L 63/061; H04L 63/10; H04L 63/06; H04L 9/0894; G06F 21/34; G06F 21/602; G06F 21/606
See application file for complete search history.

(56) References Cited

U.S. PATENT DOCUMENTS

| | | | |
|---|---|---|---|
| 8,909,930 B2 | 12/2014 | Winslow et al. | |
| 9,154,955 B1 | 10/2015 | Bertz et al. | |
| 9,524,399 B1* | 12/2016 | Takahashi | G06F 12/1466 |
| 9,537,650 B2 | 1/2017 | Auradkar et al. | |
| 10,073,981 B2 | 9/2018 | Arasu et al. | |
| 10,212,143 B2 | 2/2019 | Allain et al. | |
| 2004/0160903 A1* | 8/2004 | Gai | H04L 63/105 370/254 |
| 2005/0190758 A1* | 9/2005 | Gai | H04L 12/4645 370/389 |
| 2016/0248738 A1* | 8/2016 | Brandsma | H04B 5/0031 |
| 2017/0310485 A1* | 10/2017 | Robbins | H04L 9/006 |
| 2018/0262468 A1* | 9/2018 | Kumar | H04L 63/0281 |
| 2020/0106763 A1* | 4/2020 | Pancholi | H04L 9/3213 |

\* cited by examiner

*Primary Examiner* — Michael R Vaughan
(74) *Attorney, Agent, or Firm* — Polsinelli (57) ABSTRACT

A method includes generating, by an internal segmentation orchestrator, a key to cipher/decipher a cryptographic segmentation tag used by an untrusted device, transmitting the key to an external segmentation orchestrator, transmitting the cryptographic segmentation tag to the external segmentation orchestrator and provisioning a trusted network edge with the key and optionally the cryptographic segmentation tag. The method can also include onboarding, based on the key and the cryptographic segmentation tag, the untrusted device, wherein the untrusted device receives the cryptographic segmentation tag from the external segmentation orchestrator.

15 Claims, 7 Drawing Sheets

SYSTEMS AND METHODS FOR PROVIDING SECURITY ORCHESTRATION FOR TRUSTED TRAFFIC SEGMENTATION ON UNTRUSTED DEVICES

TECHNICAL FIELD

The subject matter of this disclosure relates in general to providing traffic segmentation based on data-plane tagging and more specifically to a solution for dealing with characteristics of untrusted devices outside of a trusted network and how to utilize keys and segmentation tags to onboard untrusted devices into the trusted network.

BACKGROUND

Enterprise networks are heavily dependent on traffic segmentation based on data-plane tagging. Current Cisco enterprise offerings (e.g. SDA, Viptela, etc.) leverage Virtual Networks Identifiers (VNIs) and Scalable Group Tags (SGTs) to apply, respectively, macro and micro segmentation across the network infrastructure. This allows the system to apply traffic engineering and access control policies according to the segmentation tags carried in the data-plane.

To apply segmentation tags (e.g. VNI/SGT), orchestration components are required to program data-plane tagging rules into network devices. However, current solutions are built on the premise that the network devices (e.g. edge switches) inserting segmentation tags can be trusted. With the current shift to Zero Trust Networking, there can be a subset of enterprise devices that belong to the enterprise but cannot be trusted to the same level of trust as the rest of the network infrastructure. Examples of these enterprise devices that can be considered untrusted (or not trusted as the rest of the enterprise infrastructure) can be: mobile phones, home routers, Internet of Things (IoT) gateways, connected vehicles, etc.

These untrusted devices have a number of characteristics that can cause problems or suggest that they should not be trusted. Such devices are commonly on the public Internet, exposed to attacks, move across different access networks, use different gateways to connect to the trusted infrastructure, quickly establish and drop connections, and can have multiple simultaneous connections back to the enterprise. While applying segmentation tags at these untrusted devices may be desirable to capture the context only available at them, their particular characteristics make it challenging for an internal segmentation orchestrator (internal to the trusted network) to manage these devices.

While traffic re-classification at the edge of the trusted network is possible (and done today), that implies that some context associated with the traffic is lost.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

There is a need for a solution capable of coping with the particular characteristics of untrusted devices. The solution should be capable of applying meaningful traffic segmentation tags to the untrusted devices, and able to make this segmentation tagging usable across the trusted and untrusted sections of the enterprise network infrastructure.

An example method includes generating, by an internal segmentation orchestrator, a key to cipher/decipher a cryptographic segmentation tag used by an untrusted device, transmitting the key to an external segmentation orchestrator, transmitting the cryptographic segmentation tag to the external segmentation orchestrator and provisioning a trusted network edge with the key and/or the cryptographic segmentation tag. The method can also include onboarding, based on the key and/or the cryptographic segmentation tag, an untrusted device, wherein the untrusted device receives the cryptographic segmentation tag from the external segmentation orchestrator.

Description of Example Embodiments

Disclosed herein are systems, methods, and computer-readable media for innovations which enable the use of a combination of a key which is used to cipher or decipher cryptographic segmentation tags used by untrusted devices and valid segmentation tags provided to untrusted devices in order to onboard on trusted devices onto a trusted network via communication between the uninterested device and a trusted network edge.

Figure 1:
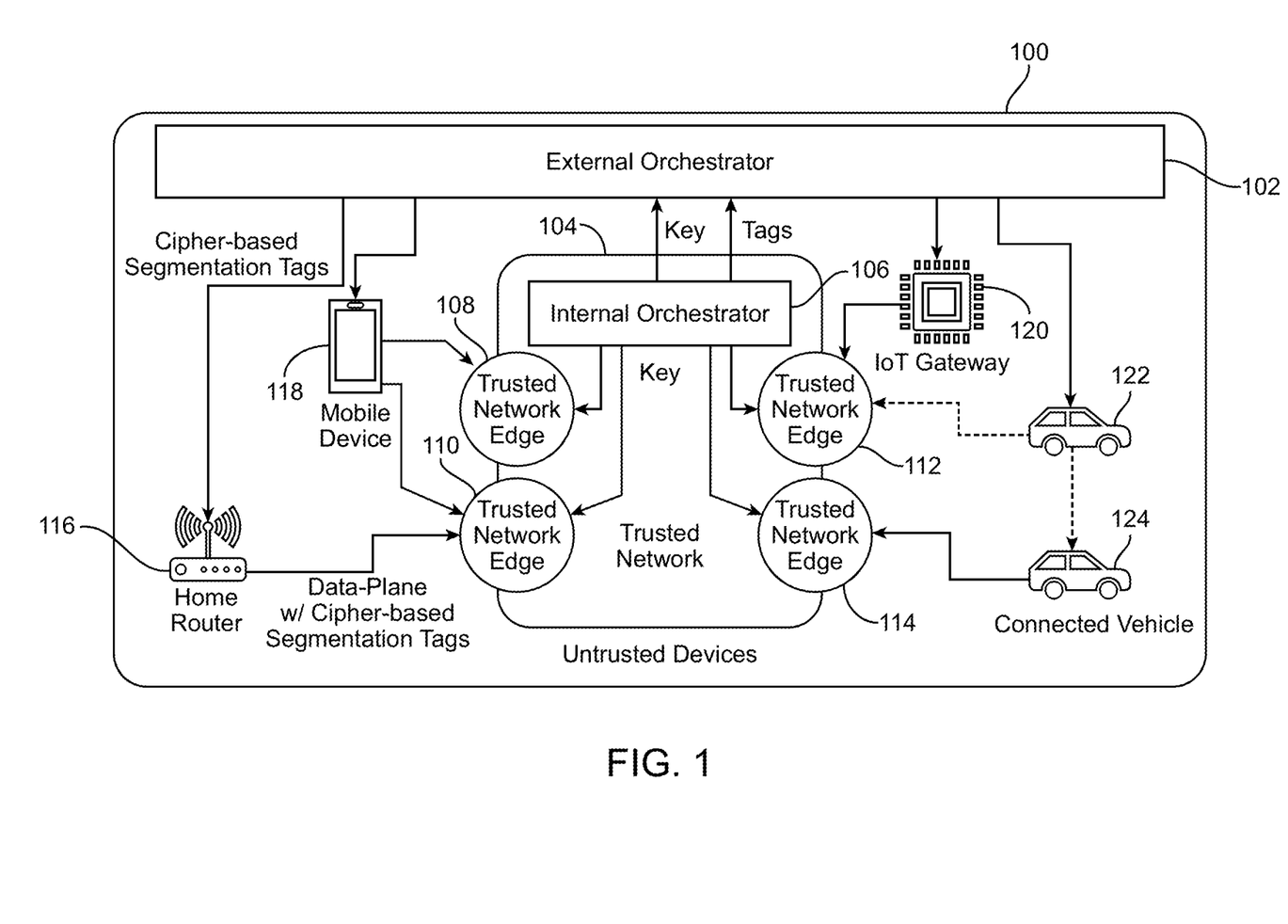
FIG. 1 illustrates a topology of an enterprise network in accordance with some examples.

FIG. 1 illustrates the network environment 100 which is applicable to the present disclosure. The edge of the trusted enterprise network 104 can receive enterprise data traffic from an enterprise network device outside of the perimeter of the trusted enterprise infrastructure. As shown in FIG. 1, the trusted network 104 includes an internal orchestrator 106 as well as a number of trusted network edges 108, 110, 112, 114. An example of an internal orchestrator is the Cisco Network Services Orchestrator or the Cisco DNA-Center. Untrusted devices are shown, by way of example, as a mobile device 118, a home router 116, an Internet of Things (IoT) Gateway 120, a first vehicle 122 and a second connected vehicle 124. The two cars represent the same car that has moved from one point to another. One of the management challenges of untrusted devices on the Internet is that a device may change its location and/or connect via a different trusted edge. This disclosure will allow the edge of the trusted enterprise network 104 to trust the segmentation information received on the data-plane, despite not completely trusting the enterprise device that applied it.

FIG. 1 illustrates a first vehicle 122 and a second connected vehicle 124. The line between vehicle 122 and trusted network edge 112 is dotted. The dotted line represents movement of the vehicle such that the first vehicle 122 shown is the vehicle in a first position and the second vehicle 124 represents the vehicle having moved to a second position.

The reference to vehicle 122 and vehicle 124 can represent a moving vehicle which initially onboards to the trusted network via trusted network edge 112 and then later transitions (such as via a hand-off operation) to trusted network edge 114 as the vehicle is moving. In one aspect, the system could also cover or manage a handoff scenario for an untrusted device that is moving from one location to another.

This disclosure introduces a new idea of an external segmentation orchestrator 102 that extends or complements the internal segmentation orchestrator 106 and handles the segmentation management of untrusted devices. To accommodate the characteristics of enterprise untrusted devices that connect from outside of the enterprise trusted network 104, the external orchestrator 102 should be Internet-facing, cloud-native, globally reachable, and with multiple points of presence. The external segmentation orchestrator 102 manages segmentation for untrusted devices that receive keys and/or valid segmentation tags from the internal orchestrator 106 and distributes the segmentation tags to the various untrusted devices.

A second idea introduced in this this disclosure is that the untrusted device will not be provisioned with segmentation tag(s) (e.g. VNI and/or SGT) in clear, as it is done today in the trusted enterprise infrastructure. Instead, the external orchestrator 102 will push only cipher-based segmentation tag(s) to the respective untrusted device. This will prevent the untrusted device from tampering with the assigned segmentation tag(s) in order to gain access to resources. Thus, a novel feature of this disclosure relates to the external orchestrator 102 providing the cipher-based segmentation tag(s) to untrusted devices. "In clear" as used above means unencrypted. In other words, the untrusted devices receive encrypted segmentation tags for use in onboarding.

The edge(s) of the trusted enterprise network 108, 110, 112, 114 that receive the enterprise-tagged packets from the untrusted device 116, 118, 120, 122, 124 will have the key to decipher the cipher-based segmentation tags used by a respective untrusted device. This enables the trusted network edges 108, 110, 112, 114 to verify the applied tag(s) and forward the tag(s) in clear to the rest of the enterprise network infrastructure. The edges 108, 110, 112, 114 do not need to be provisioned with any information regarding the untrusted network devices. The edges can be configured to accept the cipher-based segmentation tag(s) received in the data-plane by means of checking them with the provisioned key and/or a list of acceptable segmentation tags. Thus, another novel aspect of this disclosure relates to having the trusted network edges 108, 110, 112, 114 verify the cipher-based segmentation tags applied by untrusted devices. Note that the internal orchestrator 106 will provision the edge(s) with the key and may or may not provision segmentation tags or ciphered segmentation tags to the edge(s).

One interesting aspect of this disclosure is that by means of the cipher-based segmentation tags and the operation of the trusted network edges 108, 110, 112, 114, the segmentation management of trusted devices and untrusted devices can be split across the internal orchestrator 106 and the external orchestrator 102, respectively. In this regard, the system can use each of the internal orchestrator 106 and the external orchestrator 102 that is best suited to deal with the characteristics and requirements of the two different types of devices (i.e. trusted and untrusted).

This disclosure next discusses in more detail the cipher-based segmentation tags. Depending on the scenario, the segmentation tags to be ciphered can be for macro segmentation (e.g., using a virtual network instance (VNI)), micro segmentation (e.g., using scalable group tags (SGT)) or both. The selection affects the system as a whole since both segmentation orchestrators (internal and external) and the trusted network edges need to know which segmentation tags are going to be cipher-based.

The cipher-based segmentation tags can be carried between the respective untrusted device and the respective trusted network edge in the same data-plane used within the trusted network infrastructure (e.g., VXLAN-GPO). If the number of tag bits in such data-plane is not considered large enough to encode cipher-based segmentation tags, an alternative data-plane can be used between the untrusted devices and the trusted network edges. For the cases in which an alternative data-plane is needed, this disclosure proposes the idea of using VXLAN-GPE with the "next protocol" for providing cipher-based segmentation tags. VXLAN-GPE is a generic protocol extension for VXLAN (Virtual eXtensible Local Area Network) and GPE stands for a Generic Protocol Extension. Such next protocol can define explicit lengths per each of the two cipher-base segmentation tags (macro and micro). For more information about using VXLAN-GPE, see the following site: tools.ietf.org/html/draft-ietf-nvo3-vxlan-gpe-06. The draft protocol at this website is incorporated herein by reference. Some data from that site is discussed next. This disclosure introduces the idea of using the "next protocol" feature of VXLAN-GPE to carry the longer SGTs/VNIs and leverages the VXLAN-GPE to carry the longer SGTs/VNIs.

The Virtual eXtensible Local Area Network VXLAN (See RFC7348) defines an encapsulation format that encapsulates Ethernet frames in an outer UDP/IP transport. The UDP protocol is a User Datagraph Protocol used across the Internet for time sensitive transmissions. As data centers evolve, the need to carry other protocols encapsulated in an IP packet is required, as well as the need to provide increased visibility and diagnostic capabilities within the overlay. The VXLAN header does not specify the protocol being encapsulated and therefore is currently limited to encapsulating only Ethernet frame payload, nor does it provide the ability to define OAM (Operations, Administration and Maintenance) protocols. In addition, RFC6335 requires that new transports not use transport layer port numbers to identify tunnel payload. Rather, this framework encourages encapsulations to use their own identifiers for this purpose. VXLAN GPE is intended to extend the existing VXLAN protocol to provide protocol typing, OAM, and versioning capabilities. In order to facilitate deployments of VXLAN GPE with hardware currently deployed to support VXLAN, changes from legacy VXLAN have been kept to a minimum.

Figure 2:
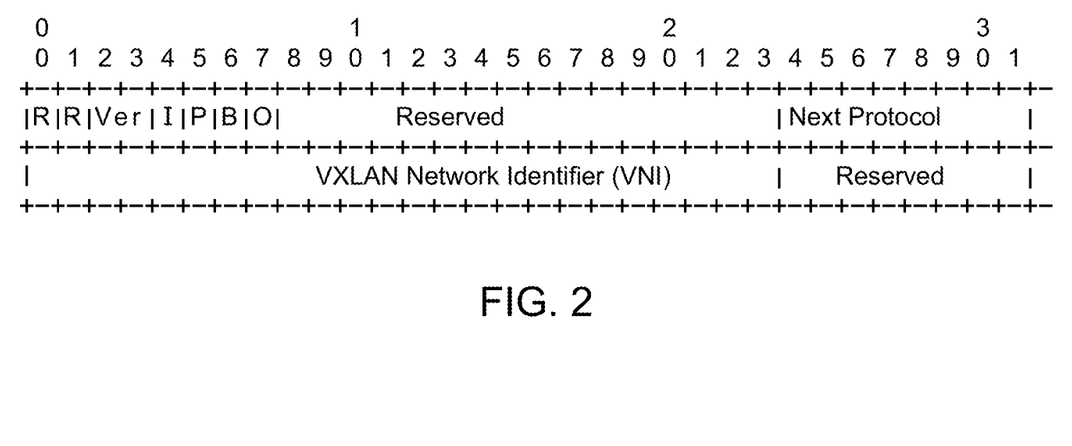
FIG. 2 illustrates a header structure.

FIG. 2 illustrates the header structure of the VXLAN GPE Header. The first 8 bits of the header are the flag field containing reserved flag bits. The bits designated "R" above are the reserved flags. These must be set to zero on transmission and ignored on receipt. The version (Ver): Indicates VXLAN GPE protocol version. The initial version is 0. If a receiver does not support the version indicated, it must drop the packet. The Instance Bit (I bit) must be set to indicate a valid VNI. The Next Protocol Bit (P bit) is set to indicate that the Next Protocol field is present. The BUM Traffic Bit (B bit) is set to indicate that this is ingress-replicated BUM Traffic (i.e., Broadcast, Unknown unicast, or Multicast). The OAM Flag Bit (O bit) is set to indicate that the packet is an OAM packet. The Next Protocol is an 8 bit field that indicates the protocol header immediately following the VXLAN GPE header. The VNI is a 24 bit field that identifies the VXLAN overlay network that the inner packet belongs to. Inner packets belonging to different VNIs cannot communicate with each other (unless explicitly allowed by policy). The reserved fields must be set to zero on transmission and ignored on receipt.

For scenarios that require both tags to be cipher-based, the external segmentation orchestrator 102 can cipher them independently or can combine both tags before ciphering them. In the last case, the external segmentation orchestrator 102 will first concatenate the segmentation tags in order (first macro then micro), cipher them, and then split them in two again. A selection needs to be made system wide since the external orchestrator 102 needs to know how to cipher the segmentation tags and the trusted network edges 108, 110, 112, 114 need to know how to decipher them. These processes represent an additional novelty disclosed herein which is combining the macro and micro segmentation tags when ciphering/deciphering them.

In another aspect of this disclosure, if a specific data-plane is used, the segmentation tags can be included in clear as long as a signature is provided by the external segmentation orchestrator 102. In that case, the key is used to verify the signature rather than to decipher the cipher-based tags. In that case a VXLAN-GPE data-plane with the Next Protocol "Segmentation Signature" could be defined. Thus, the data-plane can include a signature for the segmentation tags. If the signature is applied, the tag can be sent in clear (unencrypted), since the signature will prevent its tampering.

Untrusted device on-boarding is another process that is an aspect of this disclosure. Once the untrusted devices get connectivity to the Internet, they reach out to the external orchestrator 102 to announce their presence. They also request the external orchestrator 102 to provision them with the appropriate segmentation tag(s) they have to use when sending traffic to the enterprise network.

This is another feature or step that represents an innovation disclosed herein. The concept of untrusted devices announcing their presence and retrieving cipher-based tag(s) from the external orchestrator 102 is novel. The external orchestrator 102 selects the particular segmentation tag(s) to assign to each untrusted device among the tag(s) that the untrusted devices 116, 118, 120, 122, 124 are allowed to use. This selection can be based on policies defined on the external orchestrator 102 and/or on the security assessment of the devices. This security assessment can be performed by the orchestrator or other components (e.g. Mobile Device Management, Duo Mobile, Umbrella, etc.). After selecting the appropriate tag(s), the external orchestrator 102 uses the shared key to cipher the segmentation tag(s). It then replies to the respective untrusted device with the cipher-based tag(s) the untrusted device is allowed to use.

The following is a discussion of network operation with respect to untrusted devices and the trusted edge. An untrusted device will reach the trusted network infrastructure via one (or more) of the trusted network edges. The respective trusted network edge can be a VPN (Virtual Private Network) terminator, a border router announcing the enterprise address space, etc.

The respective untrusted device uses the segmentation tag(s) received from the external orchestrator 102 to appropriately tag the traffic that it sends to the trusted enterprise network 104. The edge of the trusted enterprise network 104 verifies the segmentation tag(s) received from the untrusted device. It does so by using the key received from the internal segmentation orchestrator 106 to decipher the segmentation tag(s) received. If, after deciphering the segmentation tag(s), they do not map to one of the segmentation tag(s) allowed for untrusted devices, the traffic will be dropped and a security alert will be raised. Corrective measures could be implemented such as requesting a new tag by the edge or the untrusted device or other measures as well.

Note that there is no need to keep state data between the untrusted devices and the edges of the trusted enterprise network 104. Once provisioned with the appropriate cipher-based segmentation tags, the untrusted devices can roam across different trusted network edges and/or use multiple trusted network edges simultaneously.

Additional security mechanisms are described next. Traditional encryption methods (e.g. IPSec, MACSEC, etc) to prevent man-in the middle (MITM) attacks can be in place to protect the traffic between different enterprise network devices (including from the untrusted device to the trusted enterprise infrastructure). The methods are orthogonal to the mechanisms described in this disclosure. Since the segmentation managed by the external orchestrator 102 is enabled by the internal orchestrator 106 (by provisioning the key(s) and/or tag(s) in the external orchestrator and 106 trusted network edges), the internal orchestrator 106 can revoke at any time the segmentation done by the external orchestrator 102. In other words, if the external orchestrator 102 is compromised, the internal orchestrator 106 can notify the edges 108, 110, 112, 114 of the trusted network 104 and prevent them from using any segmentation tags coming from untrusted devices.

Additional security mechanisms can complement the ones described to enhance the overall security of the system. A particular example is that it is possible to protect the system even if the cipher-based tags get compromised at some point during operation. In order to do so, the trusted enterprise network edge may only accept packets from an untrusted network device that uses segmentation tags that maintain or decrease its current access level. The trusted enterprise network edge in this case will not accept packets from an untrusted device that tries to use segmentation tags that increase its current access level. In order to use this additional security mechanism, the internal segmentation orchestrator 106 has to determine the access level for each of the segmentation tags to be used by untrusted devices and provision the edges of the trusted network infrastructure 104 with the access level information. This will prevent a malicious untrusted device to escalate its access privileges even if it gets access to a cipher-based segmentation tag above its current access level. While only allowing decreasing access level is something commonly used in security, there is novelty in the combination of decreasing access level with cipher-based segmentation tags.

Figure 3:
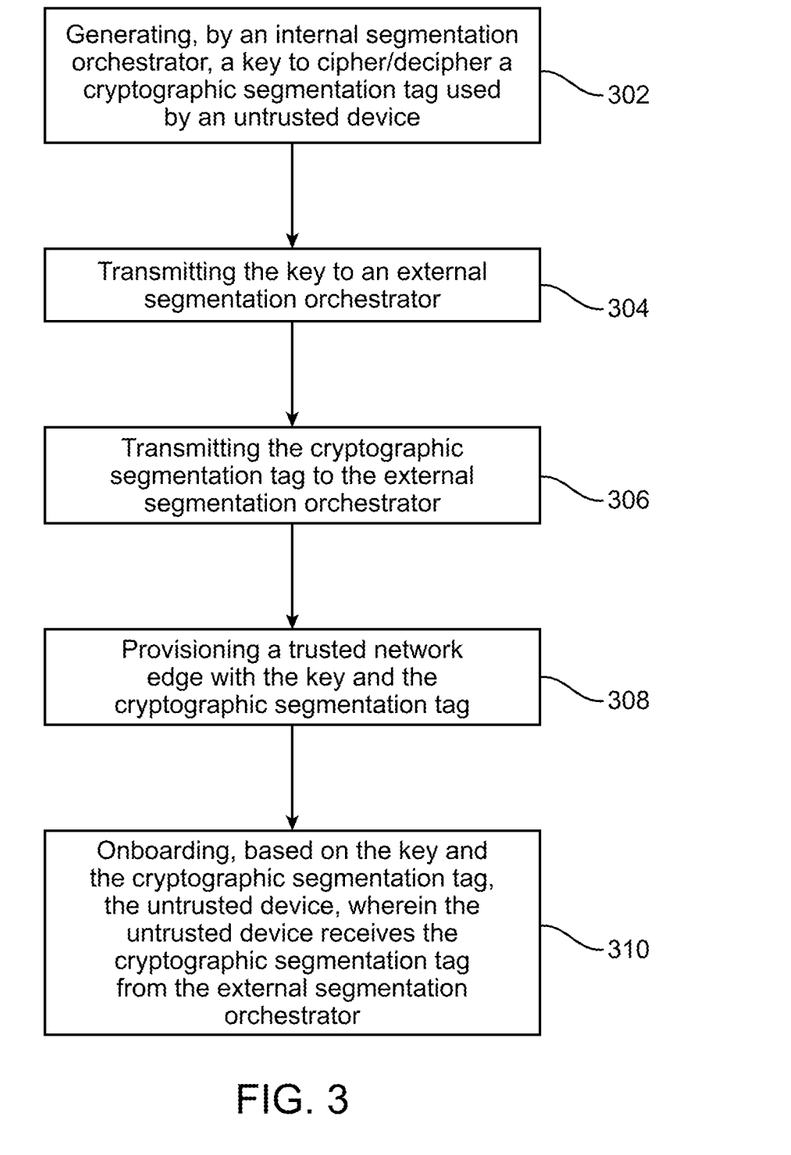
FIG. 3 illustrates a method embodiment from the standpoint of the internal segmentation orchestrator.

FIG. 3 illustrates an example method from the standpoint of the internal orchestrator 106. An example method can include one or more of generating, by an internal segmentation orchestrator, a key to cipher/decipher a cryptographic segmentation tag used by an untrusted device (302), transmitting the key to an external segmentation orchestrator (304), transmitting the cryptographic segmentation tag to the external segmentation orchestrator (306) and provisioning a trusted network edge with the key and/or the cryptographic segmentation tag (308). The method can also include onboarding, based on the key and/or the cryptographic segmentation tag, the untrusted device, wherein the untrusted device receives the cryptographic segmentation tag from the external segmentation orchestrator (310). In one aspect, the external segmentation orchestrator uses the key to encrypt the segmentation tag and create the ciphered or cryptographic segmentation tag(s). Note that the system may or may not provide the cipher segmentation tags to the trusted network edge. The cipher segmentation tags can be provisioned with the valid segmentation tags when the system wants to add an extra level of security and verify that the untrusted device is not using a tag it is not allowed to.

Onboarding the untrusted device can include receiving, at the trusted network edge, the cryptographic segmentation tag. The cryptographic segmentation tag can be configured for one of macro segmentation, micro-segmentation, or both macro segmentation and micro segmentation. In one aspect, the cryptographic segmentation tag can be carried in a specific data-plane between the untrusted device and the trusted network edge. In another aspect, a signature for the cryptographic segmentation tag can be applied. The untrusted device in another aspect can announce its presence to the external segmentation orchestrator and receive a ciphered cryptographic segmentation tag.

Figure 4:
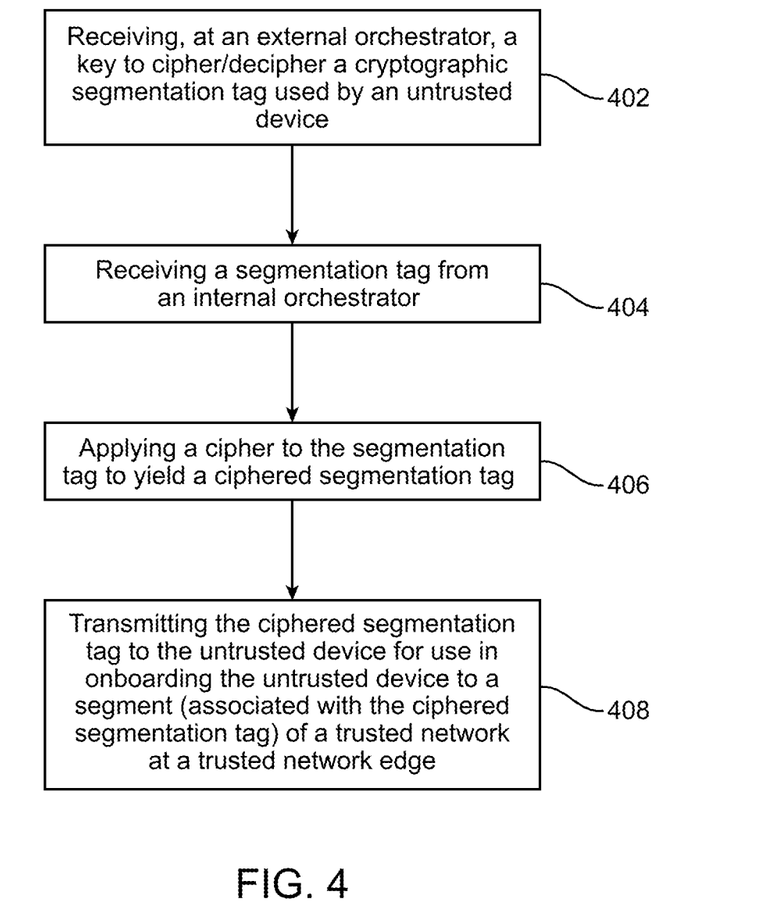
FIG. 4 illustrates a method embodiment from the standpoint of the external segmentation orchestrator.

The concepts can also be applied to operations performed by the external orchestrator 102 as well. FIG. 4 illustrates an example method from the standpoint of the external orchestrator 102. In this regard, a method includes receiving, at an external orchestrator, a key to cipher/decipher a cryptographic segmentation tag used by an untrusted device (402), receiving a segmentation tag from an internal orchestrator (404), applying a cipher to the segmentation tag to yield a ciphered segmentation tag (406) and transmitting the ciphered segmentation tag to the untrusted device for use in onboarding the untrusted device to a segment (associated with the ciphered segmentation tag) of a trusted network at a trusted network edge (408).

Figure 5:
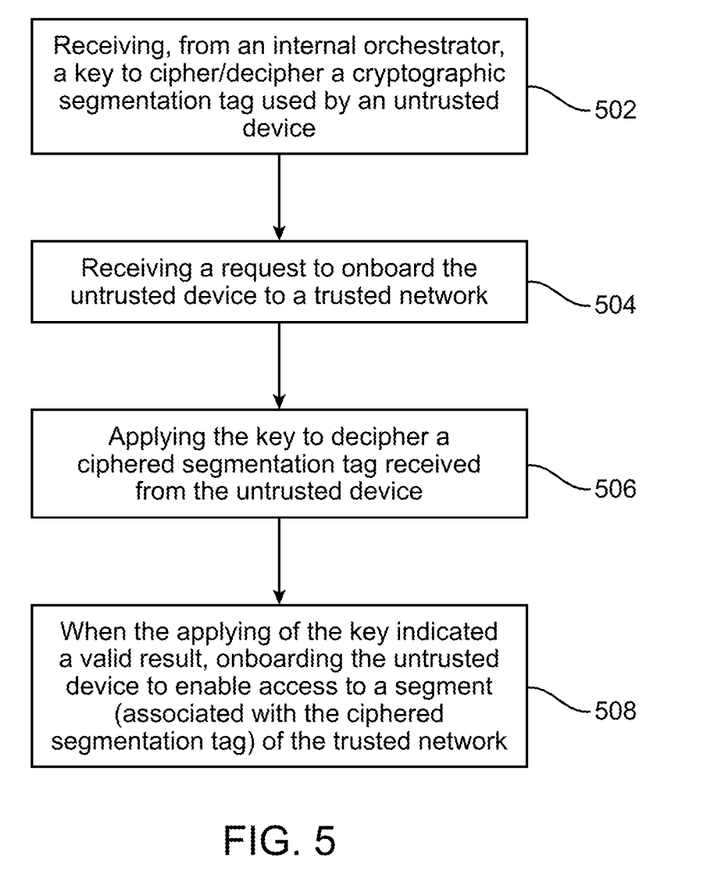
FIG. 5 illustrates a method embodiment from the standpoint of the trusted network edge.

FIG. 5 illustrates another example method from a standpoint of a trusted network edge 108, 110, 112, 114. In this regard, the method includes receiving, from an internal orchestrator, a key to cipher/decipher a cryptographic segmentation tag used by an untrusted device (502), receiving a request to onboard the untrusted device to a trusted network (504), applying the key to decipher a ciphered segmentation tag received from the untrusted device (506) and, when the applying of the key indicated a valid result, onboarding the untrusted device to enable access to a segment (associated with the ciphered segmentation tag) of the trusted network (508). In one aspect, the internal orchestrator 106 can provide segmentation tags to a respective trusted network edge. In one aspect, the cryptographic segmentation tag is configured for one of macro-segmentation, micro-segmentation, or both macro-segmentation and micro-segmentation.

In another example, an embodiment could cover functionality from the standpoint of any untrusted device 116, 118, 120, 122, 124. This example would cover steps or functionality with respect to an untrusted device receiving a cipher-based segmentation tag which then is provided via the data-plane to the trusted network edge to gain access to the trusted network 104.

Figure 6:
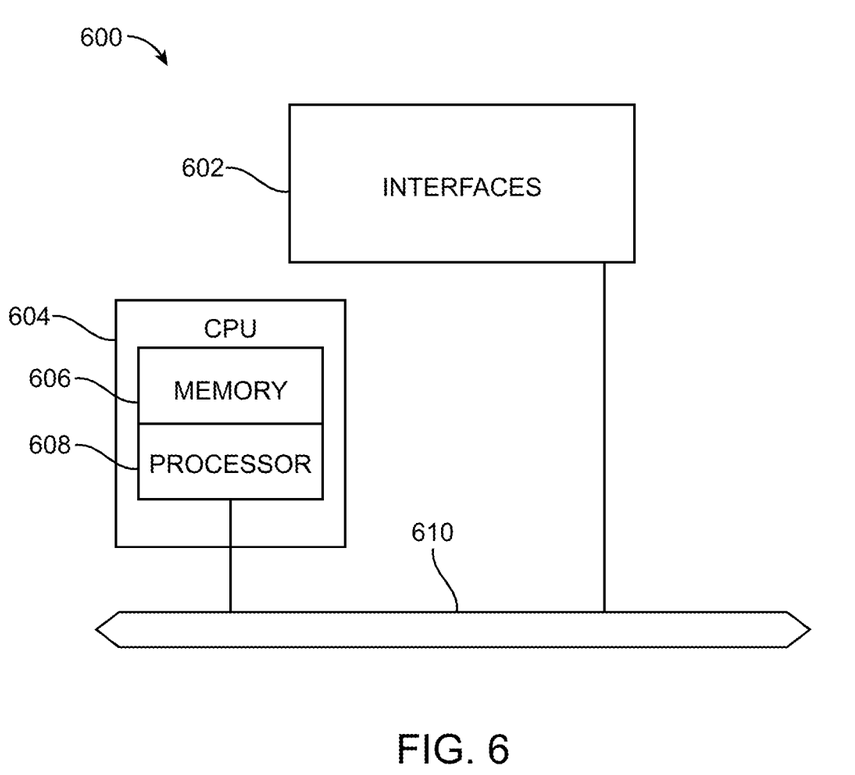
FIG. 6 illustrates an example network device in accordance with various examples.

FIG. 6 illustrates an example network device 600 suitable for implementing aspects of this disclosure. In some examples, the control plane 310 and/or the switched virtual path (SVP) 318 may be implemented according to the configuration of the network device 600. The network device 600 includes a central processing unit (CPU) 604, interfaces 602, and a connection 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. The CPU 604 may include one or more processors 608, such as a processor from the INTEL X86 family of microprocessors. In some cases, processor 608 can be specially designed hardware for controlling the operations of the network device 600. In some cases, a memory 606 (e.g., non-volatile RAM, ROM, etc.) also forms part of the CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WiFi interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 604 to efficiently perform routing computations, network diagnostics, security functions, etc.

Although the system shown in FIG. 6 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the connection 610, to exchange data and signals and coordinate various types of operations by the network device 600, such as routing, switching, and/or data storage operations, for example.

Figure 7:
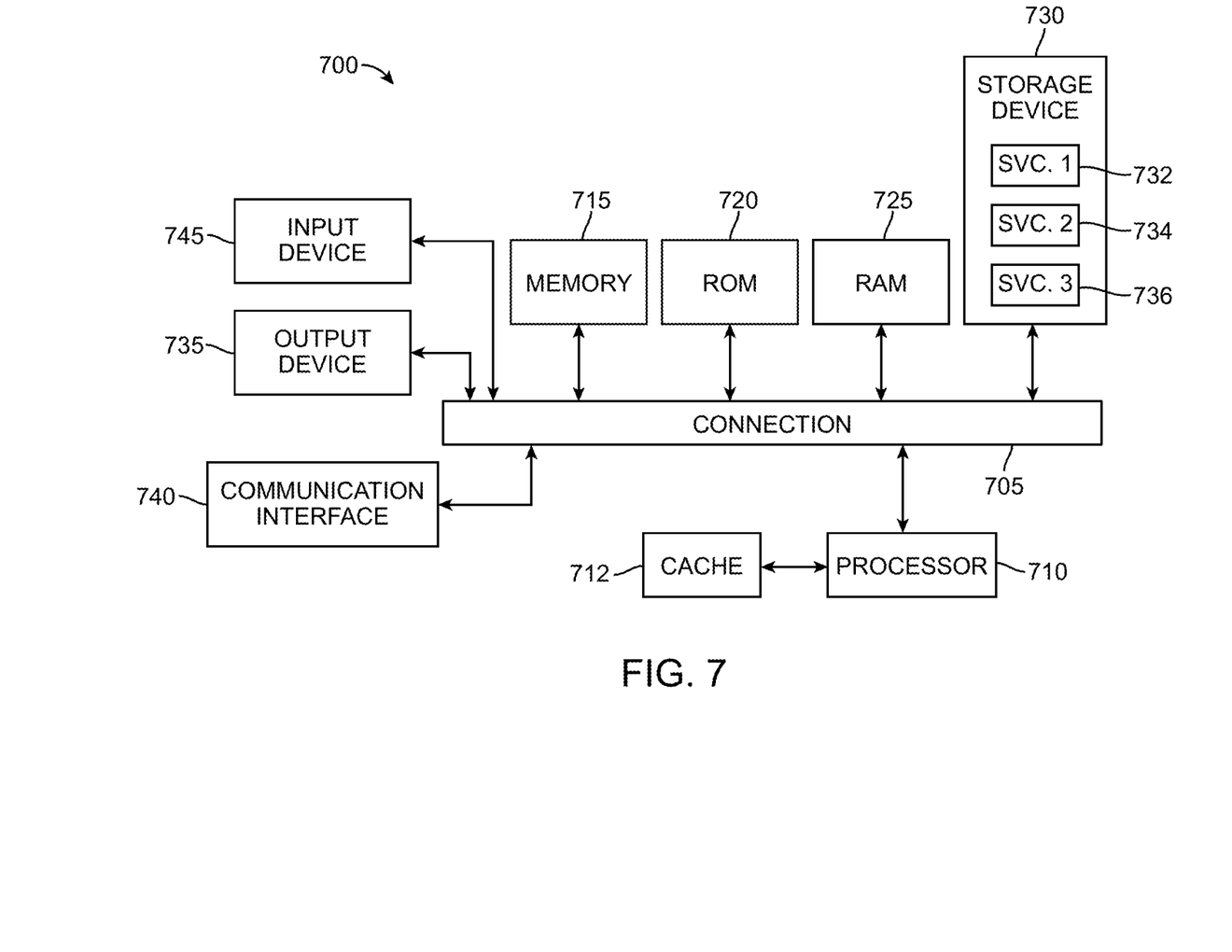
FIG. 7 illustrates an example computing device architecture, in accordance with some examples.

FIG. 7 illustrates an example computing device architecture 700 of an example computing device which can implement the various techniques described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks including devices, device components, steps or routines in a method embodied in software, or combinations of hardware and software.

One of the basic features described above is an external segmentation orchestrator 102 that off-loads the segmentation management of untrusted devices from an internal segmentation orchestrator 106. To accommodate the characteristics of enterprise untrusted devices that connect from outside of the enterprise trusted network, the external orchestrator 102 is cloud-native, globally reachable, and with multiple points of presence. Cryptographic segmentation tags are used to prevent untrusted devices from tampering with the assigned segmentation tags while allowing the trusted network to leverage the segmentation context applied by the external segmentation orchestrator 102.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
   generating, by an internal segmentation orchestrator device, a key to cipher/decipher a cryptographic segmentation tag used by an untrusted device;
   transmitting the key to an external segmentation orchestrator device;
   transmitting the cryptographic segmentation tag to the external segmentation orchestrator device;
   provisioning, via the external segmentation orchestrator device, a trusted network edge device with the key, wherein the internal segmentation orchestrator device and the trusted network edge device are within a trusted network, and wherein the external segmentation orchestrator device is outside of the trusted network; and
   onboarding, based on the key and the cryptographic segmentation tag, the untrusted device, wherein the untrusted device receives the cryptographic segmentation tag from the external segmentation orchestrator device.

2. The method of claim 1, wherein onboarding the untrusted device into a segment of a trusted network comprises receiving, at the trusted network edge device, the cryptographic segmentation tag associated with the segment.

3. The method of claim 2, wherein the cryptographic segmentation tag is carried in a specific data-plane between the untrusted device and the trusted network edge device.

4. The method of claim 3, wherein a signature for the cryptographic segmentation tag is applied.

5. The method of claim 1, wherein the cryptographic segmentation tag is configured for one of macro segmentation, micro-segmentation, or both macro-segmentation and micro-segmentation.

6. The method of claim 1, further comprising:
   provisioning the trusted network edge device with the cryptographic segmentation tag.

7. A system comprising:
   one or more processors;
   an internal segmentation orchestrator device operating on the one or more processors;
   an external segmentation orchestrator device operating on the one or more processors; and
   a non-transitory computer readable medium, storing instructions which, when executed by the processor, cause the one or more processors to perform operations comprising:
      generating, via the internal segmentation orchestrator device, a key to cipher/decipher a cryptographic segmentation tag used by an untrusted device;
      transmitting, from the internal segmentation orchestrator device, the key to an external segmentation orchestrator;
      transmitting, from the internal segmentation orchestrator device, the cryptographic segmentation tag to the external segmentation orchestrator device;
      provisioning, via the external segmentation orchestrator device, a trusted network edge device using the key, wherein the internal segmentation orchestrator device and the trusted network edge device are within a trusted network, and wherein the external segmentation orchestrator device is outside of the trusted network; and
      onboarding, based on the key and the cryptographic segmentation tag, the untrusted device, wherein the untrusted device receives the cryptographic segmentation tag from the external segmentation orchestrator device.

8. The system of claim 7, wherein onboarding the untrusted device into a segment of the trusted network comprises receiving, at the trusted network edge device, the cryptographic segmentation tag associated with the network segment.

9. The system of claim 7, wherein the cryptographic segmentation tag is configured for one of macro-segmentation, micro-segmentation, or both macro-segmentation and micro-segmentation.

10. The system of claim 9, wherein the cryptographic segmentation tag is carried in a specific data-plane between the untrusted device and the trusted network edge device.

11. The system of claim 10, wherein a signature for the cryptographic segmentation tag is applied.

12. The system of claim 7, wherein the non-transitory computer readable medium stores additional instructions which, when executed by the processor, cause the processor to perform operations further comprising:
   provisioning the trusted network edge device with the cryptographic segmentation tag.

13. A method comprising:
   receiving, from an internal orchestrator device and at an external orchestrator device, a key to cipher/decipher a cryptographic segmentation tag used by an untrusted device;
   receiving a segmentation tag from the internal orchestrator device;
   applying a cipher to the segmentation tag to yield a ciphered segmentation tag; and
   transmitting, from the external orchestrator device, the ciphered segmentation tag to the untrusted device for use in onboarding the untrusted device to a segment of a trusted network at a trusted network edge device, wherein the internal orchestrator device and the trusted network edge device are within the trusted network, and wherein the external orchestrator device is outside of the trusted network.

14. The method of claim 13, wherein the ciphered segmentation tag is used to onboard, based on the key, the untrusted device.

15. The method of claim 14, wherein onboarding the untrusted device into a segment of the trusted network comprises receiving, at the trusted network edge device, the ciphered segmentation tag associated with the segment.

\* \* \* \* \*